United States Patent
Hao (10) Patent No.: US 9,727,162 B2
(45) Date of Patent: Aug. 8, 2017

(54) GOA DRIVING CIRCUIT APPLIED FOR FLAT PANEL DISPLAY DEVICE AND FLAT PANEL DISPLAY DEVICE

(71) Applicant: Shenzhen China Star Optoelectronics Technology Co., Ltd., Shenzhen, Guangdong (CN)

(72) Inventor: Sikun Hao, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 193 days.

(21) Appl. No.: 14/433,648

(22) PCT Filed: Jan. 28, 2015

(86) PCT No.: PCT/CN2015/071711
§ 371 (c)(1),
(2) Date: Apr. 4, 2015

(87) PCT Pub. No.: WO2016/106926
PCT Pub. Date: Jul. 7, 2016

(65) Prior Publication Data
US 2016/0188076 A1    Jun. 30, 2016

(30) Foreign Application Priority Data

Dec. 30, 2014   (CN) .......................... 2014 1 0850796

(51) Int. Cl.
*G06F 3/041*    (2006.01)
*G09G 3/36*    (2006.01)

(52) U.S. Cl.
CPC .......... *G06F 3/0416* (2013.01); *G06F 3/0412* (2013.01); *G09G 3/3677* (2013.01)

(58) Field of Classification Search
CPC ..................................................... G06F 3/041
See application file for complete search history.

(56) References Cited

U.S. PATENT DOCUMENTS

2014/0055411 A1   2/2014  Zhao
2015/0248867 A1   9/2015  Tan et al.
(Continued)

FOREIGN PATENT DOCUMENTS

CN    103943055 A    7/2014
CN    103943083 A    7/2014
(Continued)

*Primary Examiner* — Alexander Eisen
*Assistant Examiner* — Cory Almeida
(74) *Attorney, Agent, or Firm* — Andrew C. Cheng (57) ABSTRACT

The invention provides a GOA driving circuit applied for a flat panel display device and a flat panel display device. The GOA driving circuit includes a front-stage circuit, a middle-stage circuit and a rear-stage circuit. GOA driving subunits in the front-stage circuit, the middle-stage circuit and the rear-stage circuit receive a first clock signal and a second clock signal to sequentially generate corresponding gate driving signals. The first clock signal and the second clock signal are set with an interruption period to generate an interruption between the sequentially generated gate driving signals. The flat panel display device performs a touch detection operation in the interruption period. By the above solution, the invention can achieve the interruption of GOA driving circuit scan and thereby increase touch scan frequency.

18 Claims, 4 Drawing Sheets

(56) References Cited

U.S. PATENT DOCUMENTS

2015/0277651 A1* 10/2015 Zhang .................. G06F 3/0416
  345/173
2016/0049126 A1   2/2016 Zhang et al.
2016/0259455 A1*  9/2016 Li ........................ G06F 3/0412

FOREIGN PATENT DOCUMENTS

CN      203858844 U    10/2014
JP      2007140256 A    6/2007

* cited by examiner

GOA DRIVING CIRCUIT APPLIED FOR FLAT PANEL DISPLAY DEVICE AND FLAT PANEL DISPLAY DEVICE

TECHNICAL FIELD

The invention relates to the field of display technology, and particularly to a GOA driving circuit applied for a flat panel display device and a flat panel display device.

DESCRIPTION OF RELATED ART

The GOA (gate driver on array) has advantages of reduced production cost and narrow border design, and has gradually been applied in liquid crystal displays (LCD) field. Meanwhile, a touch sensing technology which can provide a natural interface between an electronic system and a user also has been widely used in various fields, especially an in-cell touch technology which has advantages such as thin and high touch sensitivity.

When the GOA driving circuit and the touch sensing technology are combined together for applications in the prior art, in a general situation, when the panel normally works, a GOA circuit driven scan is firstly performed and then a touch signal output scan is performed after all gate lines have been scanned, the process of the GOA circuit driven scan has no interruption, and therefore a frequency of the GOA circuit driven scan and a frequency of the touch signal output scan are consistent with each other, i.e., one time of GOA circuit driven scan only is corresponding to one time of touch signal output scan, so that the touch scan frequency is limited.

SUMMARY

A technical problem mainly to be solved by the invention is to provide a GOA driving circuit applied for a flat panel display device and a flat panel display device, so as to achieve an interruption of GOA driving circuit scan and thereby increase touch scan frequency.

In order to solve the technical problem, a technical solution proposed by the invention is to provide a GOA driving circuit applied for a flat panel display device. The GOA driving circuit includes a front-stage circuit including a plurality of cascade-connected GOA driving subunits;

a middle-stage circuit including two cascade-connected GOA driving subunits, wherein an input terminal of a former stage of the GOA driving subunits in the middle-stage circuit is electrically connected to an output terminal of a last stage of the plurality of GOA driving subunits in the front-stage circuit;

a rear-stage circuit includes a plurality of cascade-connected GOA driving subunits, wherein an input terminal of a first stage of the plurality of GOA driving subunits in the rear-stage circuit is electrically connected to an output terminal of a latter stage of the GOA driving subunits in the middle-stage circuit;

wherein the GOA driving subunits in the front-stage circuit, the middle-stage circuit and the rear-stage circuit are configured (i.e., structured and arranged) for receiving a first clock signal and a second clock signal to sequentially generate corresponding gate driving signals respectively, the first clock signal and the second clock signal are set with an interruption period for generating an interruption between the sequentially generated gate driving signals, and the flat panel display device is configured for performing a touch detection operation in the interruption period; the interruption period is greater than a time of one pulse signal and less than a time of one frame image.

In an embodiment, each stage of the GOA driving subunits in the front-stage circuit, the middle-stage circuit and the rear-stage circuit is electrically connected to a corresponding gate line and configured for outputting a corresponding one of the sequentially generated gate driving signals to the corresponding gate line.

In an embodiment, the first clock signal and the second clock signal each include a first period, the interruption period, a restore period and a second period;

in the first period, the first clock signal and the second clock signal respectively output pulse signals with just opposite polarities, the GOA driving subunits in the front-stage circuit of the GOA driving circuit sequentially output a part of the sequentially generated gate driving signals to drive a part of gate lines of the flat panel display device respectively;

in the interruption period, the first clock signal is maintained at a first logic and the second clock signal is maintained at a second logic, a polarity of the first logic and a polarity of the second logic are opposite; and in the interruption period, the middle-stage circuit and the rear-stage circuit of the GOA driving circuit stop outputting of gate driving signal;

in the restore period, the first clock signal is maintained at the second logic, the second clock signal outputs one second logic signal and one first logic signal, and the middle-stage circuit of the GOA driving circuit restores to output succeeding two gate driving signals;

in the second period, the first clock signal and the second clock signal respectively output pulse signals with just opposite polarities, the rear-stage circuit of the GOA driving circuit outputs the remaining of the sequentially generated gate driving signals.

In an embodiment, the first logic is a logic low level, and the second logic is a logic high level.

In an embodiment, the interruption period is adjusted according to actual requirement.

In an embodiment, the front-stage circuit, the middle-stage circuit and the rear-stage circuit each include an odd stage GOA driving subunit and an even stage GOA driving subunit.

In an embodiment, the odd stage GOA driving subunit and the even stage GOA driving subunit of the front-stage circuit each include:

a first inverter including an input terminal, a first clock control terminal, a second clock control terminal and an output terminal, the input terminal of the first inverter being electrically connected to an output terminal of a preceding stage GOA driving subunit;

a second inverter, an input terminal of the second inverter being electrically connected to the output terminal of the first inverter;

a first NOR gate and a second NOR gate, a first input terminal of the first NOR gate being electrically connected to an output terminal of the second inverter, a second input terminal of the first NOR gate being electrically connected to an output terminal of the second NOR gate, an output terminal of the first NOR gate being electrically connected to a first input terminal of the second NOR gate, and a second input terminal of the second NOR gate being electrically connected to the input terminal of the second inverter;

a NAND gate, a first input terminal of the NAND gate being electrically connected to the first clock signal or the second clock signal, and a second input terminal of the NAND gate being electrically connected to the output terminal of the second NOR gate;

a third inverter, an input terminal of the third inverter being electrically connected to an output terminal of the NAND gate;

a fourth inverter, an input terminal of the fourth inverter being electrically connected to an output terminal of the third inverter, and an output terminal of the fourth inverter being used as an output terminal of current stage GOA driving subunit to output a corresponding one of the sequentially generated gate driving signals;

wherein in the odd stage GOA driving subunit of the front-stage circuit, the first clock control terminal of the first inverter is electrically connected to the first clock signal, the second clock control terminal of the first inverter is electrically connected to the second clock signal, and the first input terminal of the NAND gate is electrically connected to the first clock signal;

wherein in the even stage GOA driving subunit of the front-stage circuit, the first clock control terminal of the first inverter is electrically connected to the second clock signal, the second clock control terminal of the first inverter is electrically connected to the first clock signal, and the first input terminal of the NAND gate is electrically connected to the second clock signal.

In an embodiment, the odd stage GOA driving subunit in the middle-stage circuit includes:

a first inverter including an input terminal, a first clock control terminal, a second clock control terminal and an output terminal, the input terminal of the first inverter being electrically connected to the output terminal of the last stage GOA driving subunit in the front-stage circuit;

a second inverter, an input terminal of the second inverter being electrically connected to an output terminal of the first inverter;

a first NOR gate and a second NOR gate, a first input terminal of the first NOR gate being electrically connected to an output terminal of the second inverter, a second input terminal of the first NOR gate being electrically connected to an output terminal of the second NOR gate, an output terminal of the first NOR gate being electrically connected to a first input terminal of the second NOR gate, and a second input terminal of the second NOR gate being electrically connected to the input terminal of the second inverter;

a tri-state NAND gate including a first input terminal, a second input terminal, a third input terminal and an output terminal, the first input terminal of the tri-state NAND gate being electrically connected to the output terminal of the second NOR gate;

a third inverter, an input terminal of the third inverter being electrically connected to the output terminal of the tri-state NAND gate;

a fourth inverter, an input terminal of the fourth inverter being electrically connected to an output terminal of the third inverter, and output terminal of the fourth inverter being used as an output terminal of current stage GOA driving subunit to output a corresponding one of the sequentially generated gate driving signal;

wherein in the odd stage GOA driving subunit of the middle-stage circuit, the first clock control terminal of the first inverter and the second input terminal of the tri-state NAND gate are electrically connected to the first clock signal, the second clock control terminal of the first inverter and the third input terminal of the tri-state NAND gate are electrically connected to the second clock signal;

the even stage GOA driving subunit in the middle-stage circuit includes:

a first inverter including an input terminal, a first clock control terminal, a second clock terminal and an output terminal, the input terminal of the first inverter being electrically connected to an output terminal of a preceding stage GOA driving subunit;

a second inverter, an input terminal of the second inverter being electrically connected to the output terminal of the first inverter;

a first NOR gate and a second NOR gate, a first input terminal of the first NOR gate being electrically connected to an output terminal of the second inverter, a second input terminal of the first NOR gate being electrically connected to an output terminal of the second NOR gate, an output terminal of the first NOR gate being electrically connected to a first input terminal of the second NOR gate, and a second input terminal of the second NOR gate being electrically connected to the input terminal of the second inverter;

a third inverter, an input terminal of the third inverter being electrically connected to the output terminal of the second NOR gate;

a fourth inverter including a first input terminal, a second input terminal and an output terminal, the first input terminal of the fourth inverter being electrically connected to an output terminal of the third inverter;

a fifth inverter, an input terminal of the fifth inverter being electrically connected to the output terminal of the fourth inverter, and an output terminal of the fifth inverter being used as an output terminal of current stage GOA driving subunit to output a corresponding one of the sequentially generated gate driving signals;

wherein in the even stage GOA driving subunit of the middle-stage circuit, the first clock control terminal of the first inverter and the second input terminal of the fourth inverter are electrically connected to the second clock signal, the second clock control terminal of the first inverter is electrically connected to the first clock signal.

In an embodiment, the odd stage GOA driving subunit and the even stage GOA driving subunit in the rear-stage circuit each include:

a first inverter including an input terminal, a first clock control terminal, a second clock control terminal and an output terminal, the input terminal of the first inverter being electrically connected to an output terminal of a last stage GOA driving subunit in the front-stage circuit;

a second inverter, an input terminal of the second inverter being electrically connected to the output terminal of the first inverter;

a first NOR gate and a second NOR gate, a first input terminal of the first NOR gate being electrically connected to an output terminal of the second inverter, a second input terminal of the first NOR gate being electrically connected to an output terminal of the second NOR gate, an output terminal of the first NOR gate being electrically connected to a first input terminal of the second NOR gate, and a second input terminal of the second NOR gate being electrically connected to the input terminal of the second inverter;

a NAND gate, a first input terminal of the NAND gate being electrically connected to the first clock signal or the second clock signal, and a second input terminal of the NAND gate being electrically connected to the output terminal of the second NOR gate;

a third inverter, an input terminal of the third inverter being electrically connected to an output terminal of the NAND gate;

a fourth inverter, an input terminal of the fourth inverter being electrically connected to an output terminal of the third inverter, and an output terminal of the fourth inverter being used as an output terminal of current stage GOA driving subunit to output a corresponding one of the sequentially generated gate driving signals;

wherein in the odd stage GOA driving subunit of the rear-stage circuit, the first clock control terminal of the first inverter is electrically connected to the first clock signal, the second clock control terminal of the first inverter is electrically connected to the second clock signal, and the first input terminal of the NAND gate is electrically connected to the first clock signal;

wherein in the even stage GOA driving subunit of the rear-stage circuit, the first clock control terminal of the first inverter is electrically connected to the second clock signal, the second clock control terminal of the first inverter is electrically connected to the first clock signal, and the first input terminal of the NAND gate is electrically connected to the second clock control signal.

In order to solve the above technical problem, another technical solution proposed by the invention is to provide a GOA driving circuit applied for a flat panel display device. The GOA driving circuit includes:

a front-stage circuit including a plurality of cascade-connected GOA driving subunits;

a middle-stage circuit including two cascade-connected GOA driving subunits, wherein an input terminal of a former stage of the GOA driving subunits in the middle-stage circuit is electrically connected to an output terminal of a last stage of the plurality of GOA driving subunits in the front-stage circuit;

a rear-stage circuit including a plurality of cascade-connected GOA driving subunits, wherein an input terminal of a first stage of the plurality of GOA driving subunits in the rear-stage circuit is electrically connected to an output terminal of a latter stage of the GOA driving subunits in the middle-stage circuit;

wherein the GOA driving subunits in the front-stage circuit, the middle-stage circuit and the rear-stage circuit are configured for receiving a first clock signal and a second clock signal to sequentially generate corresponding gate driving signals, an interruption period is set in the first clock signal and the second clock signal to generate an interruption between the sequentially generated gate driving signals, and the flat panel display device is configured for performing a touch detection operation in the interruption period.

In an embodiment, each stage of the GOA driving subunits in the front-stage circuit, the middle-stage circuit and the rear-stage circuit is electrically connected to a corresponding gate line and configured for outputting a corresponding one of the sequentially generated gate driving signals to the corresponding gate line.

In an embodiment, the first clock signal and the second clock signal each include a first period, the interruption period, a restore period and a second period;

in the first period, the first clock signal and the second clock signal respectively output pulse signals with just opposite polarities, the GOA driving subunits in the front-stage circuit of the GOA driving circuit sequentially output a part of the sequentially generated gate driving signals to drive a part of gate lines of the flat panel display device respectively;

in the interruption period, the first clock signal is maintained at a first logic and the second clock signal is maintained at a second logic, a polarity of the first logic and a polarity of the second logic are opposite; and in the interruption period, the middle-stage circuit and the rear-stage circuit of the GOA driving circuit stop outputting of gate driving signal;

in the restore period, the first clock signal is maintained at the second logic, the second clock signal outputs one second logic signal and one first logic signal, and the middle-stage circuit of the GOA driving circuit restores to output succeeding two gate driving signals;

in the second period, the first clock signal and the second clock signal respectively output pulse signals with just opposite polarities, the rear-stage circuit of the GOA driving circuit outputs the remaining of the sequentially generated gate driving signals.

In an embodiment, the first logic is a logic low level, and the second logic is a logic high level.

In an embodiment, the interruption period is adjusted according to actual requirement.

In an embodiment, the front-stage circuit, the middle-stage circuit and the rear-stage circuit each include an odd stage GOA driving subunit and an even stage GOA driving subunit.

In an embodiment, the odd stage GOA driving subunit and the even stage GOA driving subunit of the front-stage circuit each include:

a first inverter including an input terminal, a first clock control terminal, a second clock control terminal and an output terminal, the input terminal of the first inverter being electrically connected to an output terminal of a preceding stage GOA driving subunit;

a second inverter, an input terminal of the second inverter being electrically connected to the output terminal of the first inverter;

a first NOR gate and a second NOR gate, a first input terminal of the first NOR gate being electrically connected to an output terminal of the second inverter, a second input terminal of the first NOR gate being electrically connected to an output terminal of the second NOR gate, an output terminal of the first NOR gate being electrically connected to a first input terminal of the second NOR gate, and a second input terminal of the second NOR gate being electrically connected to the input terminal of the second inverter;

a NAND gate, a first input terminal of the NAND gate being electrically connected to the first clock signal or the second clock signal, and a second input terminal of the NAND gate being electrically connected to the output terminal of the second NOR gate;

a third inverter, an input terminal of the third inverter being electrically connected to an output terminal of the NAND gate;

a fourth inverter, an input terminal of the fourth inverter being electrically connected to an output terminal of the third inverter, and an output terminal of the fourth inverter being used as an output terminal of current stage GOA driving subunit to output a corresponding one of the sequentially generated gate driving signals;

wherein in the odd stage GOA driving subunit of the front-stage circuit, the first clock control terminal of the first inverter is electrically connected to the first clock signal, the second clock control terminal of the first inverter is electrically connected to the second clock signal, and the first input terminal of the NAND gate is electrically connected to the first clock signal;

wherein in the even stage GOA driving subunit of the front-stage circuit, the first clock control terminal of the first inverter is electrically connected to the second clock signal, the second clock control terminal of the first inverter is electrically connected to the first clock signal, and the first input terminal of the NAND gate is electrically connected to the second clock signal.

In an embodiment, the odd stage GOA driving subunit in the middle-stage circuit includes:

a first inverter including an input terminal, a first clock control terminal, a second clock control terminal and an output terminal, the input terminal of the first inverter being electrically connected to the output terminal of the last stage GOA driving subunit in the front-stage circuit;

a second inverter, an input terminal of the second inverter being electrically connected to an output terminal of the first inverter;

a first NOR gate and a second NOR gate, a first input terminal of the first NOR gate being electrically connected to an output terminal of the second inverter, a second input terminal of the first NOR gate being electrically connected to an output terminal of the second NOR gate, an output terminal of the first NOR gate being electrically connected to a first input terminal of the second NOR gate, and a second input terminal of the second NOR gate being electrically connected to the input terminal of the second inverter;

a tri-state NAND gate including a first input terminal, a second input terminal, a third input terminal and an output terminal, the first input terminal of the tri-state NAND gate being electrically connected to the output terminal of the second NOR gate;

a third inverter, an input terminal of the third inverter being electrically connected to the output terminal of the tri-state NAND gate;

a fourth inverter, an input terminal of the fourth inverter being electrically connected to an output terminal of the third inverter, and output terminal of the fourth inverter being used as an output terminal of current stage GOA driving subunit to output a corresponding one of the sequentially generated gate driving signal;

wherein in the odd stage GOA driving subunit of the middle-stage circuit, the first clock control terminal of the first inverter and the second input terminal of the tri-state NAND gate are electrically connected to the first clock signal, the second clock control terminal of the first inverter and the third input terminal of the tri-state NAND gate are electrically connected to the second clock signal;

the even stage GOA driving subunit in the middle-stage circuit includes:

a first inverter including an input terminal, a first clock control terminal, a second clock terminal and an output terminal, the input terminal of the first inverter being electrically connected to an output terminal of a preceding stage GOA driving subunit;

a second inverter, an input terminal of the second inverter being electrically connected to the output terminal of the first inverter;

a first NOR gate and a second NOR gate, a first input terminal of the first NOR gate being electrically connected to an output terminal of the second inverter, a second input terminal of the first NOR gate being electrically connected to an output terminal of the second NOR gate, an output terminal of the first NOR gate being electrically connected to a first input terminal of the second NOR gate, and a second input terminal of the second NOR gate being electrically connected to the input terminal of the second inverter;

a third inverter, an input terminal of the third inverter being electrically connected to the output terminal of the second NOR gate;

a fourth inverter including a first input terminal, a second input terminal and an output terminal, the first input terminal of the fourth inverter being electrically connected to an output terminal of the third inverter;

a fifth inverter, an input terminal of the fifth inverter being electrically connected to the output terminal of the fourth inverter, and an output terminal of the fifth inverter being used as an output terminal of current stage GOA driving subunit to output a corresponding one of the sequentially generated gate driving signals;

wherein in the even stage GOA driving subunit of the middle-stage circuit, the first clock control terminal of the first inverter and the second input terminal of the fourth inverter are electrically connected to the second clock signal, the second clock control terminal of the first inverter is electrically connected to the first clock signal.

In an embodiment, the odd stage GOA driving subunit and the even stage GOA driving subunit in the rear-stage circuit each include:

a first inverter including an input terminal, a first clock control terminal, a second clock control terminal and an output terminal, the input terminal of the first inverter being electrically connected to an output terminal of a last stage GOA driving subunit in the front-stage circuit;

a second inverter, an input terminal of the second inverter being electrically connected to the output terminal of the first inverter;

a first NOR gate and a second NOR gate, a first input terminal of the first NOR gate being electrically connected to an output terminal of the second inverter, a second input terminal of the first NOR gate being electrically connected to an output terminal of the second NOR gate, an output terminal of the first NOR gate being electrically connected to a first input terminal of the second NOR gate, and a second input terminal of the second NOR gate being electrically connected to the input terminal of the second inverter;

a NAND gate, a first input terminal of the NAND gate being electrically connected to the first clock signal or the second clock signal, and a second input terminal of the NAND gate being electrically connected to the output terminal of the second NOR gate;

a third inverter, an input terminal of the third inverter being electrically connected to an output terminal of the NAND gate;

a fourth inverter, an input terminal of the fourth inverter being electrically connected to an output terminal of the third inverter, and an output terminal of the fourth inverter being used as an output terminal of current stage GOA driving subunit to output a corresponding one of the sequentially generated gate driving signals;

wherein in the odd stage GOA driving subunit of the rear-stage circuit, the first clock control terminal of the first inverter is electrically connected to the first clock signal, the second clock control terminal of the first inverter is electrically connected to the second clock signal, and the first input terminal of the NAND gate is electrically connected to the first clock signal;

wherein in the even stage GOA driving subunit of the rear-stage circuit, the first clock control terminal of the first inverter is electrically connected to the second clock signal, the second clock control terminal of the first inverter is electrically connected to the first clock signal, and the first input terminal of the NAND gate is electrically connected to the second clock control signal.

In order to solve the above technical problem, still another technical solution proposed by the invention is to provide a flat panel display device. The flat panel display device includes the GOA driving circuit as described in any one of the above embodiments.

The efficacy can be achieved by the invention is that: different from the prior art, the GOA driving circuit applied for a flat panel display device of the invention includes successively connected front-stage circuit, middle-stage circuit and rear-stage circuit and uses a first clock signal and a second clock signal to supply signals to the front-stage circuit, the middle-stage circuit and the rear-stage circuit so as to make these circuits sequentially generate corresponding gate driving signals. The invention sets an interruption period in the first clock signal and a second clock signal, when the first clock signal and the second clock signal scan to the interruption period, the GOA driving circuit generates an interruption between the sequentially generated gate driving signals, and after the interruption period, the GOA driving circuit restores to generate corresponding gate driving signals. Moreover, in the interruption period, the flat panel display device performs a touch detection operation, so that the touch detection operation can be performed during the gate lines driving scan process and do not need to wait for all the gate lines having been scanned, the frequency of touch detection operation is increased and multi-touch can be achieved.

BRIEF DESCRIPTION OF THE DRAWINGS

In order to more clearly illustrate the technical solutions of various embodiments of the present invention, drawings will be used in the description of embodiments will be given a brief description below. Apparently, the drawings in the following description only are some embodiments of the invention, the ordinary skill in the art can obtain other drawings according to these illustrated drawings without creative effort. In the drawings.

DETAILED DESCRIPTION OF EMBODIMENTS

In the following, with reference to accompanying drawings of embodiments of the invention, technical solutions in the embodiments of the invention will be clearly and completely described. Apparently, the embodiments of the invention described below only are a part of embodiments of the invention, but not all embodiments. Based on the described embodiments of the invention, all other embodiments obtained by ordinary skill in the art without creative effort belong to the scope of protection of the invention.

Figure 1:
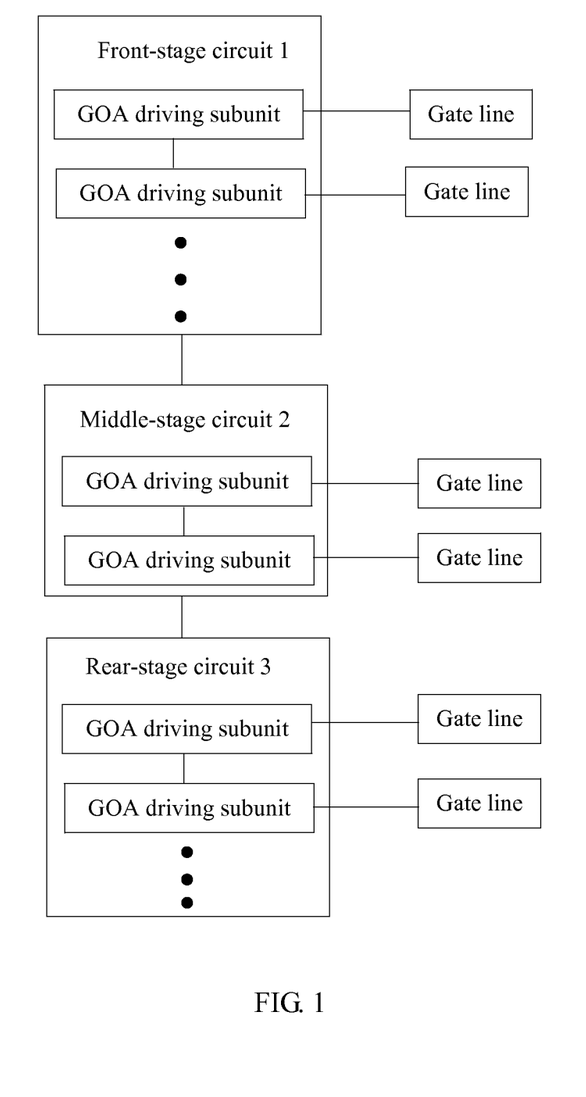
FIG. 1 is a structural schematic view of a GOA driving circuit applied for a flat panel display device of an embodiment of the invention.

In particular, an embodiment of the invention provides a GOA driving circuit applied for a flat panel display device. The GOA driving circuit is integrated on an array substrate and used for supplying gate lines with driving signals. As shown in FIG. 1, the GOA driving circuit includes sequentially electrically connected front-stage circuit 1, middle-stage circuit 2 and rear-stage circuit 3. The front-stage circuit 1 includes multiple (i.e., more than one) cascade-connected GOA driving subunits. The middle-stage circuit 2 includes two cascade-connected GOA driving subunits, and an input terminal of a former stage GOA driving subunit in the middle-stage circuit 2 is electrically connected to an output terminal of a last stage GOA driving subunit in the front-stage circuit 1. The rear-stage circuit 3 includes multiple cascade-connected GOA driving subunits, and an input terminal of a first stage GOA driving subunit in the rear-stage circuit 3 is electrically connected to an output terminal of a latter stage GOA driving subunit in the middle-stage circuit 2. In this embodiment, cascade-connected means connected in series, i.e., an output terminal of a former stage GOA driving subunit in multiple GOA driving subunits is electrically connected to an input terminal of a latter stage GOA driving subunit in the multiple GOA driving subunits. The front-stage circuit 1 and the rear-stage circuit 3 each include two or more than two GOA driving subunits. In this embodiment of the invention, each the GOA driving subunit is implemented by a shift register.

The GOA driving subunits in the front-stage circuit 1, the middle-stage circuit 2 and the rear-stage circuit 3 each receive a first clock signal and a second clock signal to sequentially generate corresponding gate driving signals, and by connecting gate lines to the respective GOA driving subunits, the GOA driving subunits can supply the gate lines with the sequentially generated gate driving signals respectively. The first clock signal and the second clock signal are set with an interruption period so as to generate an interrupt between the sequentially generated gate driving signals, and the flat panel display device performs a touch detection operation in the interruption period. When the first clock signal and the second clock signal scan to the interruption period, a signal interruption is occurred on one GOA driving subunit in the GOA driving circuit, i.e., the GOA driving subunit does not generate signal. The interruption may be occurred on any one of the GOA driving subunits in the GOA driving circuit except the first and the last GOA driving subunits, and at this time the GOA driving circuit stops the supplying of driving signal to the gate lines and the flat panel display device may perform a touch detection operation. After the interruption period, the GOA driving subunit restores to generate signal and continues to supply driving signals to the remaining gate lines. In other embodiment of the invention, two or more than two interruption periods may be set in the first clock signal and the second clock signal.

Different from the prior art, the GOA driving circuit applied for a flat panel display device in this embodiment of the invention includes successively connected front-stage circuit 1, middle-stage circuit 2 and rear-stage circuit 3, and uses the first clock signal and the second clock signal to supply the front-stage circuit 1, the middle-stage circuit 2 and the rear-stage circuit 3 with signals to thereby make the front-stage circuit 1, the middle-stage circuit 2 and the rear-stage circuit 3 to sequentially generate corresponding gate driving signals. This embodiment of the invention sets an interruption period in the first clock signal and the second clock signal, when the first clock signal and the second clock signal scan to the interruption period, the GOA driving circuit generates an interruption between the sequentially generated gate driving signals, and after the interruption period, the GOA driving circuit restores to generate the remaining of the sequentially generated gate driving signals. In the interruption period, the flat panel display device performs a touch detection operation, so that the touch detection operation is performed during the gate lines driving scan process and do not need to wait for all the gate lines having been scanned, the frequency of touch detection operation is increased and multi-touch can be achieved.

As shown in FIG. 1, each stage of the GOA driving subunits in the front-stage circuit 1, the middle-stage circuit 2 and the rear-stage circuit 3 is electrically connected to a corresponding gate line, so as to sequentially output a corresponding gate driving signal to the corresponding gate line.

Output terminals of the successively connected GOA driving subunits in the front-stage circuit, the middle-stage circuit and the rear-stage circuit respectively are electrically connected to sequentially neighboring multiple gate lines, for example, if the output terminal of one stage GOA driving subunit in the GOA driving subunits is connected to a gate line Gn, the output terminal of a preceding stage GOA driving subunit is connected to a gate line Gn−1, and the output terminal of a succeeding stage GOA driving subunit is connected to a gate line Gn+1. When the first clock signal and the second clock signal scan to the interruption period, a signal interruption would be occurred in the GOA driving circuit, for example, the interruption is occurred on the GOA driving subunit whose output terminal is connected with the gate line Gn, i.e., in the interruption period, the GOA driving subunit does not output a gate driving signal to the gate line Gn, and at this time a touch detection operation can be performed; after the interruption period, the GOA driving subunit restores to supply the gate line Gn with a gate driving signal and meanwhile sends a signal to a succeeding stage GOA driving subunit connected to the output terminal thereof to make the succeeding stage GOA driving subunit supply the gate line Gn+1 with a gate driving signal, so that the GOA driving circuit restores the driving signal scan.

The first clock signal and the second clock signal each include a first period, the interruption period, a restore period and a second period.

In the first period, the first clock signal and the second clock signal respectively output pulse signals, a polarity of the outputted pulse signal of the first clock signal and a polarity of the outputted pulse signal of the second clock signal are just opposite, the GOA driving subunits in the front-stage circuit of the GOA driving circuit sequentially output a part of the sequentially generated gate driving signals for driving a part of the gate lines on the flat panel display device; that is, in the first period, the GOA driving subunits in the front-stage circuit output gate driving signals to the corresponding gate lines connected therewith.

In the interruption period, the first clock signal is maintained at a first logic and the second clock signal is maintained at a second logic, a polarity of the first logic and a polarity of the second logic are opposite; and in the interruption period, the middle-stage circuit and the rear-stage circuit of the GOA driving circuit stop outputting of gate driving signal; that is, in the interruption period, the output terminals of the GOA driving subunits in the middle-stage circuit do not output signal and thus do not output any gate driving signal to the gate lines connected therewith. Therefore, in the interruption period, the gate lines driving is interrupted, and a touch signal scan can be performed. A length of the interruption period in this embodiment of the invention can be adjusted according to actual requirement, and generally is controlled to be greater than a time of one pulse signal (e.g., a time of one pulse of touch scan signal) and less than a time of one frame image.

In the restore period, the first clock signal is maintained at a second logic, the second clock signal outputs one second logic signal and one first logic signal, the middle-stage circuit of the GOA driving circuit restores to output succeeding two gate driving signals. Moreover, in the restore period, the GOA driving subunits in the middle-stage restore to output gate driving signals to the respective gate lines connected therewith, i.e., after the touch signal scan is finished, the GOA driving circuit continues to perform the unfinished gate line driving signal scan.

In the second period, the first clock signal and the second clock signal respectively output pulse signals, a polarity of the outputted pulse signal of the first clock signal and a polarity of the outputted pulse signal of the second clock signal are just opposite, the rear-stage circuit of the GOA driving circuit output the remaining gate driving signals to finish the gate line driving signal scan.

This embodiment of the invention divides the first clock signal and the second clock signal each into several parts, i.e., the first period, the interruption period, the restore period and the second period, and sets as that: in the first period, the front-stage circuit outputs driving signals; when the first clock signal and the second clock signal scan to the interruption period, the driving signal is sent to the middle-stage circuit, and in the interruption period, the middle-stage circuit does not output signal and stops sending the driving signal to gate line, and thus a touch signal scan can be performed in the interruption period; when arrives at the restore period, the middle-stage circuit restores to output driving signal to gate line; and when arrives at the second period, the driving signal is sent to the rear-stage circuit, and in the second period, the rear-stage circuit output driving signals to the gate lines connected therewith.

The first logic is a logic low level, and the second logic is a logic high level.

Referring to FIG. 2 through FIG. 8, the front-stage circuit, the middle-stage circuit and the rear-stage circuit each include one odd stage GOA driving subunit and one even stage GOA driving subunit connected with each other. That is, in this embodiment of the invention, the GOA driving circuit includes six GOA driving subunits in total, and thus can supply driving signals to six gate lines Gn, Gn+1, Gn+2, Gn+3, Gn+4, Gn+5.

Figure 2:
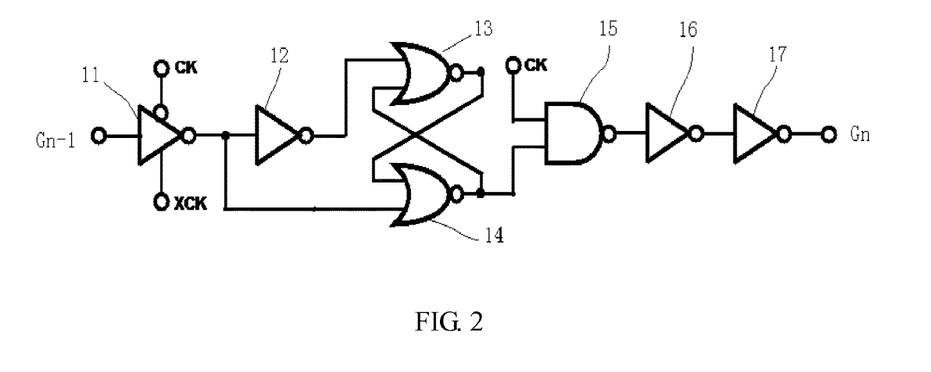
FIG. 2 is a circuit diagram of an odd stage GOA driving subunit in a front-stage circuit of an embodiment of the invention.
Figure 3:
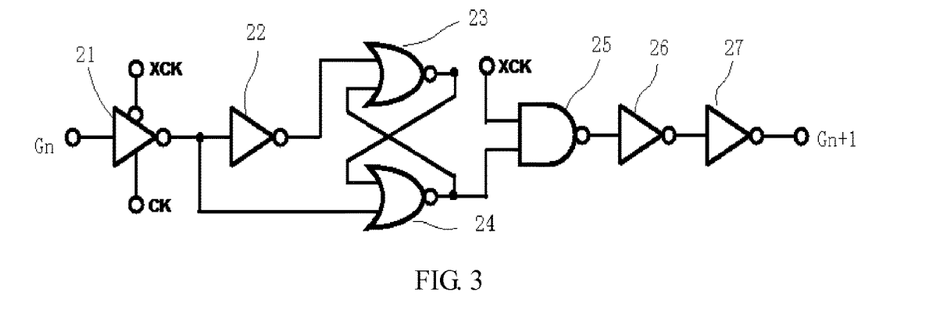
FIG. 3 is a circuit diagram of an even stage GOA driving subunit in a front-stage circuit of the embodiment of the invention.

As shown in FIG. 2 and FIG. 3, the odd stage GOA driving subunit and the even stage GOA driving subunit in the front-stage circuit have a same structure and respectively include:

first inverters 11, 21 each including an input terminal, a first clock control terminal, a second clock control terminal and an output terminal, the input terminal being electrically connected to an output terminal of a preceding stage GOA driving subunit and used as a signal input terminal of current stage GOA driving subunit; in the illustrated embodiment of the invention, the input terminal of the first inverter 11 of the odd stage GOA driving unit in the front-stage circuit being connected to receive a start signal of the GOA driving circuit, and the input terminal of the first inverter 21 of the even stage GOA driving subunit in the front-stage circuit being connected to an output terminal of a fourth inverter 17 of the odd stage GOA driving subunit in the front-stage circuit;

second inverters 12, 22, input terminals of the second inverters 12, 22 being electrically connected to the output terminals of the first inverters 11, 21 respectively;

first NOR gates 13, 23 and second NOR gates 14, 24, first input terminals of the first NOR gates 13, 23 being electrically connected to the output terminals of the second inverters 12, 22 respectively, second input terminals of the first NOR gates 13, 23 being electrically connected to output terminals of the second NOR gates 14, 24 respectively, output terminals of the first NOR gates 13, 23 being electrically connected to first input terminals of the second NOR gates 14, 24 respectively, and second input terminals of the second NOR gates 14, 24 being electrically connected to the input terminals of the second inverters 12, 22 respectively;

NAND gates 15, 25, first input terminals of the NAND gates 15, 25 being respectively electrically connected to different ones of the first clock signal CK and the second clock signal XCK, second input terminals of the NAND gates 15, 25 being electrically connected to the output terminals of the second NOR gates 14, 24 respectively;

third inverters 16, 26, input terminals of the third inverters 16, 26 being electrically connected to output terminals of the NAND gates 15, 25 respectively;

fourth inverters 17, 27, input terminals of the fourth inverters 17, 27 being electrically connected to output terminals of the third inverters 16, 26 respectively, output terminals of the fourth inverters 17, 27 being used as output terminals of respective current stage GOA driving subunits to output corresponding gate driving signals; the output terminal of the fourth inverter 17 being connected to the gate line Gn, and the output terminal of the fourth inverter 27 being connected to the gate line Gn+1.

The first clock control terminal of the first inverter 11 of the odd stage GOA driving subunit in the front-stage circuit is electrically connected to the first clock signal CK, the second clock control terminal of the first inverter 11 is electrically connected to the second clock signal XCK, and the first input terminal of the NAND gate 15 is electrically connected to the first clock signal CK.

The first clock control terminal of the first inverter 21 of the even stage GOA driving subunit in the front-stage circuit is electrically connected to the second clock signal XCK, the second clock control terminal of the first inverter 21 is electrically connected to the first clock signal CK, and the first input terminal of the NAND gate 25 is electrically connected to the second clock signal XCK.

In the illustrated embodiment of the invention, the output terminal of the fourth inverter 17 of the odd stage GOA driving subunit in the front-stage circuit is connected to the input terminal of the first inverter 21 of the even stage GOA driving subunit in the front-stage circuit.

By the above circuit design in the front-stage circuit, in the first period, the first clock signal and the second clock signal output pulse signals with opposite polarities to make the front-stage circuit be capable of outputting driving signals to corresponding gate lines.

Figure 4:
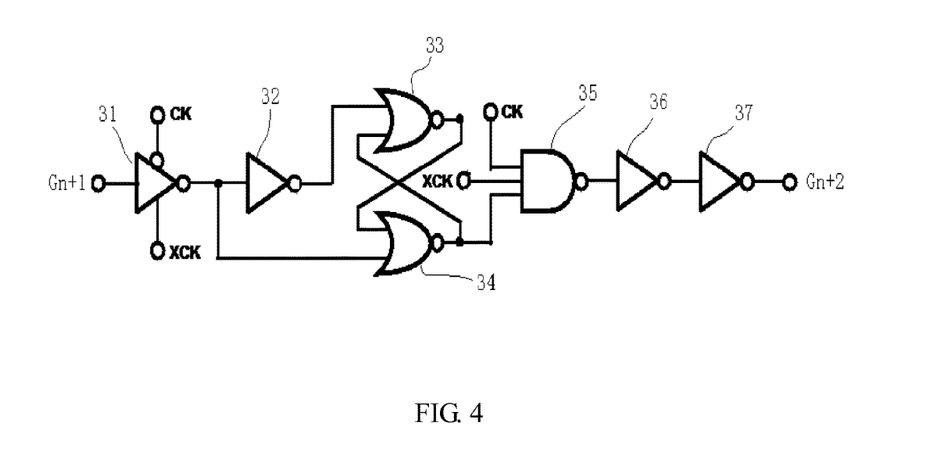
FIG. 4 is a circuit diagram of an odd stage GOA driving subunit in a middle-stage circuit of the embodiment of the invention.

The odd stage GOA driving subunit and the even stage GOA driving subunit in the middle-stage circuit have slightly different structures. As shown in FIG. 4, the odd stage GOA driving subunit in the middle-stage circuit includes:

a first inverter 31 including an input terminal, a first clock control terminal, a second clock control terminal and an output terminal, the input terminal of the first inverter 31 being electrically connected to the output terminal of the last stage GOA driving subunit in the front-stage circuit and used as a signal input terminal of current stage GOA driving subunit; in the illustrated embodiment of the invention, the input terminal of the first inverter 31 of the odd stage GOA driving subunit in the middle-stage circuit being connected to the output terminal of the fourth inverter 27 of the even stage GOA driving subunit in the front-stage circuit;

a second inverter 32, an input terminal of the second inverter 32 being electrically connected to the output terminal of the first inverter 31;

a first NOR gate 33 and a second NOR gate 34, a first input terminal of the first NOR gate 33 being electrically connected to an output terminal of the second inverter 32, a second input terminal of the first NOR gate 33 being electrically connected to an output terminal of the second NOR gate 34, an output terminal of the first NOR gate 33 being electrically connected to a first input terminal of the second NOR gate 34, and a second input terminal of the second NOR gate 34 being electrically connected to the input terminal of the input inverter 32;

a tri-state NAND gate 35 including a first input terminal, a second input terminal, a third input terminal and an output terminal; the first input terminal of the tri-state NAND gate 35 being electrically connected to the output terminal of the second NOR gate 34;

a third inverter 36, an input terminal of the third inverter 36 being electrically connected to the output terminal of the tri-state NAND gate 35;

a fourth inverter 37, an input terminal of the fourth inverter 37 being electrically connected to an output terminal of the third inverter 36, an output terminal of the fourth inverter 37 being used as an output terminal of current stage GOA driving subunit and connected to the gate line Gn+2 to output a corresponding gate driving signal.

the first clock control terminal of the first inverter 31 of the odd stage GOA driving subunit and the second input terminal of the tri-state NAND gate 35 are electrically connected to the first clock signal CK, the second clock control terminal of the first inverter 31 and the third input terminal of the tri-state NAND gate 35 are electrically connected to the second clock signal XCK.

Figure 5:
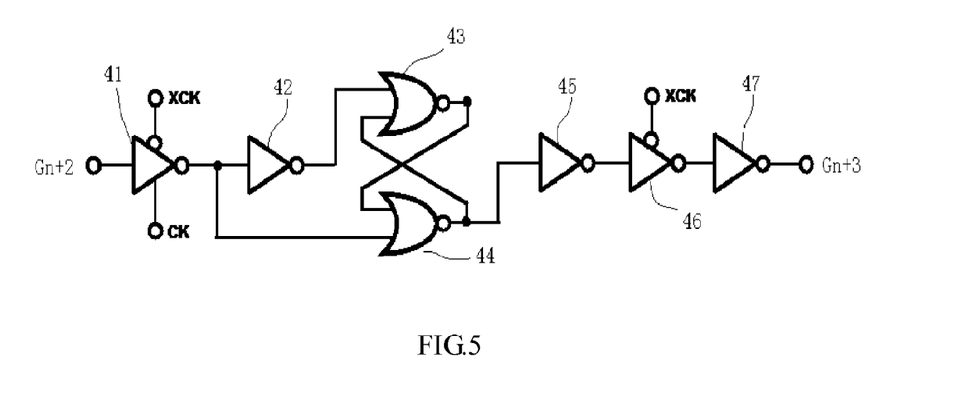
FIG. 5 is a circuit diagram of an even stage GOA driving subunit in a middle-stage circuit of the embodiment of the invention.

As shown in FIG. 5, the even stage GOA driving subunit in the middle-stage circuit includes:

a first inverter 41 including an input terminal, a first clock control terminal, a second clock control terminal and an output terminal, the input terminal of the first inverter 41 being electrically connected to the output terminal of a preceding stage GOA driving subunit, i.e., being connected to the output terminal of the fourth inverter 37 of the odd stage GOA driving subunit in the middle-stage circuit;

a second inverter 42, an input terminal of the second inverter 42 being electrically connected to the output terminal of the first inverter 41;

a first NOR gate 43 and a second NOR gate 44, a first input terminal of the first NOR gate 43 being electrically connected to an output terminal of the second inverter 42, a second input terminal of the first NOR gate 43 being electrically connected to an output terminal of the second NOR gate 44, an output terminal of the first NOR gate 43 being electrically connected to a first input terminal of the second NOR gate 44, and a second input terminal of the second NOR gate 44 being electrically connected to the input terminal of the second inverter 42;

a third inverter 45, an input terminal of the third inverter 45 being electrically connected to the output terminal of the second NOR gate 44;

a fourth inverter 46 including a first input terminal, a second input terminal and an output terminal, the first input terminal of the fourth inverter 46 being electrically connected to an output terminal of the third inverter 45;

a fifth inverter 47, an input terminal of the fifth inverter 47 being electrically connected to the output terminal of the fourth inverter 46, and an output terminal of the fifth inverter 47 being used as the output terminal of current stage GOA driving subunit and connected to the gate line Gn+3 to output a corresponding gate driving signal.

The first clock control terminal of the first inverter 41 in the even stage GOA driving subunit and the second input terminal of the fourth inverter 46 are electrically connected to the second clock signal XCK, the second clock control terminal of the first inverter 41 is electrically connected to the first clock signal CK.

By the above circuit design in the middle-stage circuit, in the interruption period, the first clock signal and the second clock respectively maintained at the first logic and the second logic with opposite polarities make the odd stage GOA driving subunit in the middle-stage circuit do not output gate driving signal and thereby the gate line driving signal scan is interrupted; and in the restore period, when the first clock signal outputs the second logic and the second clock signal outputs the second logic, the odd stage GOA driving subunit in the middle-stage circuit restores to output gate driving signal; when the first clock signal continues to output the second logic and the second clock signal outputs the first logic, the even stage GOA driving subunit in the middle-stage circuit outputs gate driving signal, so that the GOA driving circuit restores to supply driving signals to corresponding gate lines.

Figure 6:
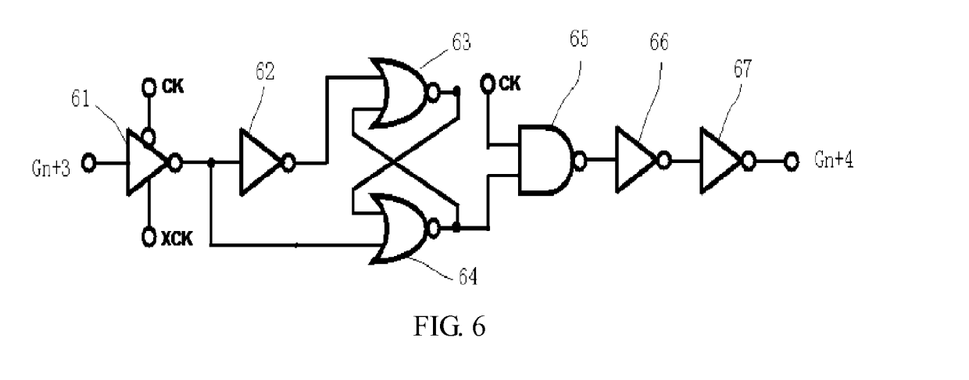
FIG. 6 is a circuit diagram of an odd stage GOA driving subunit in a rear-stage circuit of the embodiment of the invention.
Figure 7:
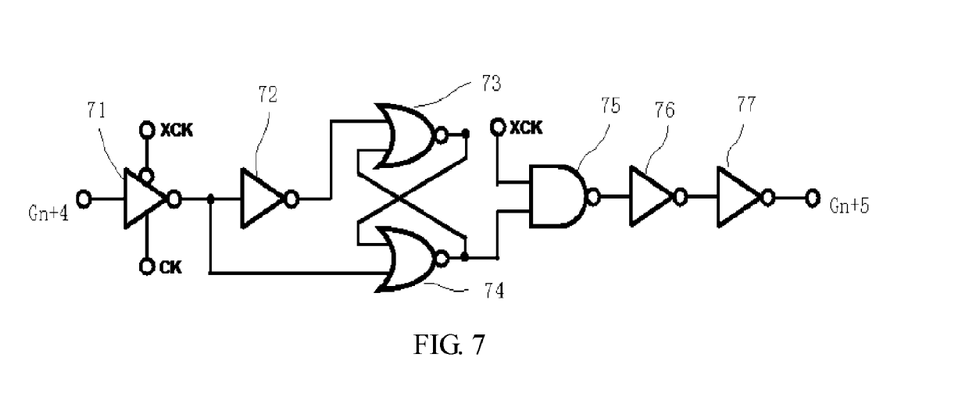
FIG. 7 is a circuit diagram of an even stage GOA driving subunit in a rear-stage circuit of the embodiment of the invention.
Figure 8:
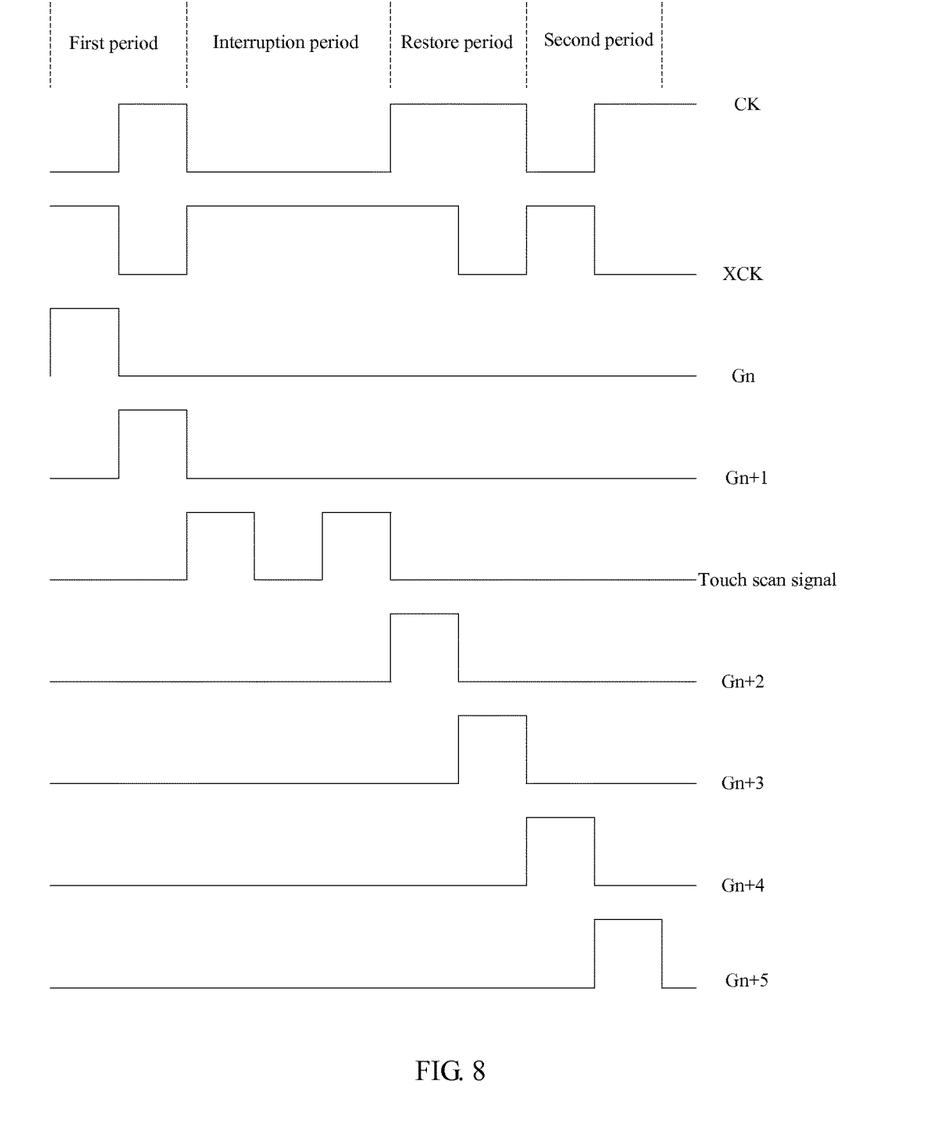
FIG. 8 is a schematic diagram of output timings of a GOA driving circuit of an embodiment of the invention.

Referring to FIG. 6 and FIG. 7, the odd stage GOA driving subunit and the even stage GOA driving subunit in the rear-stage circuit have a same structures and respectively include:

first inverters 61, 71 each including an input terminal, a first clock control terminal, a second clock control terminal and an output terminal, the input terminal being electrically connected to an output terminal of a preceding stage GOA driving subunit and used as a signal input terminal of current stage GOA driving subunit; in the illustrated embodiment of the invention, the input terminal of the first inverter 61 of the odd stage GOA driving subunit in the rear-stage circuit being electrically connected to the output terminal of the fifth inverter 47 of the even stage GOA driving subunit in the middle-stage circuit and used as the signal input terminal of the odd stage GOA driving subunit in the rear-stage circuit, the input terminal of the first inverter 71 of the even stage GOA driving subunit in the rear-stage circuit being electrically connected to the output terminal of a fourth inverter 67 of the odd stage GOA driving subunit in the rear-stage GOA driving subunit;

second inverters 62, 72, input terminals of the second inverters 62, 72 being electrically connected to the output terminals of the first inverters 61, 71 respectively;

first NOR gates 63, 73 and second NOR gates 64, 74; first input terminals of the first NOR gates 63, 73 being electrically connected to output terminals of the second inverters 62, 72 respectively, second input terminals of the first NOR gates 63, 73 being electrically connected to output terminals of the second NOR gates 64, 74 respectively, output terminals of the first NOR gates 63, 73 being electrically connected to first input terminals of the second NOR gates 64, 74 respectively, second input terminals of the second NOR gates 64, 74 being electrically connected to the input terminals of the second inverters 62, 72 respectively;

NAND gates 65, 75, first input terminals of the NAND gates 65, 75 being electrically connected to different ones of the first clock signal CK and the second clock signal XCK, second input terminals of the NAND gates 65, 75 being electrically connected to the output terminals of the second NOR gates 64, 74 respectively;

third inverters 66, 76, input terminals of the third inverters 66, 76 being electrically connected to output terminals of the NAND gates 65, 75 respectively;

fourth inverters 67, 77, input terminals of the fourth inverters 67, 77 being electrically connected to output terminals of the third inverters 66, 76 respectively, output terminals of the fourth inverters 67, 77 being respectively used as output terminals of current stage GOA driving subunits to output corresponding gate driving signals; the output terminal of the fourth inverter 67 being connected to the gate line Gn+4, and the output terminal of the fourth inverter 77 being connected to the gate line Gn+5.

The first clock control terminal of the first inverter 61 in the odd stage GOA driving subunit is electrically connected to the first clock signal CK, the second clock control terminal of the first inverter 61 is electrically connected to the second clock signal XCK, and the first input terminal of the NAND gate 65 is electrically connected to the first clock signal CK.

The first clock control terminal of the first inverter 71 in the even stage GOA driving subunit is electrically connected to the second clock signal XCK, the second clock control terminal of the first inverter 71 is electrically connected to the first clock signal CK, and the first input terminal of the NAND gate 75 is electrically connected to the second clock signal XCK.

By the above circuit design in the rear-stage circuit, in the second period, the first clock signal and the second clock signal respectively output pulse signals with opposite polarities to make the rear-stage circuit be capable of outputting driving signals to corresponding gate lines.

In other embodiment of the invention, the front-stage circuit may include more than two GOA driving subunits. When the front-stage circuit includes more than two GOA driving subunits, each odd stage GOA driving subunit thereof has a structure and a connection manner same as that of the odd stage GOA driving subunit of the front-stage circuit in the above illustrated embodiment, each even stage GOA driving subunit thereof has a structure and a connection manner same as that of the even stage GOA driving subunit of the front-stage circuit in the above illustrated embodiment. For example, the front-stage circuit includes five successively connected GOA driving subunits, the first, third and fifth stages GOA driving subunits each have the structure and connection manner same as that of the odd stage GOA driving subunit of the front-stage circuit in the above illustrated embodiment, and the second and fourth stages GOA driving subunits each have the structure and connection manner same as that of the even stage GOA driving subunit of the front-stage circuit in the above illustrated embodiment.

In other embodiment of the invention, the rear-stage circuit may include more than two GOA driving subunits. When the rear-stage circuit includes more than two GOA driving subunits, each odd stage GOA driving subunit thereof has a structure and a connection manner same as that of the odd stage GOA driving subunit of the rear-stage circuit in the above illustrated embodiment, each even stage GOA driving subunit thereof has a structure and a connection manner same as that of the even stage GOA driving subunit of the rear-stage circuit in the above illustrated embodiment. For example, the rear-stage circuit includes five successively connected GOA driving subunits, the first, third and fifth stages GOA driving subunits each have the structure and connection manner same as that of the odd stage GOA driving subunit of the rear-stage circuit in the above illustrated embodiment, and the second and fourth stages GOA driving subunits each have the structure and connection manner same as that of the even stage GOA driving subunit of the rear-stage circuit in the above illustrated embodiment.

Another embodiment of the invention provides a flat panel display device, and the flat panel display device includes the GOA driving circuit in any one of the above embodiments.

Different from the prior art, the GOA driving circuit applied for a flat panel display device of any embodiment of the invention includes successively connected front-stage circuit, middle-stage circuit and rear-stage circuit and uses a first clock signal and a second clock signal to supply signals to the front-stage circuit, the middle-stage circuit and the rear-stage circuit so as to make these circuits sequentially generate corresponding gate driving signals. The invention in its embodiment sets an interruption period in the first clock signal and a second clock signal, when the first clock signal and the second clock signal scan to the interruption period, the GOA driving circuit generates an interruption between the sequentially generated gate driving signals, and after the interruption period, the GOA driving circuit restores to generate corresponding gate driving signals. Moreover, in the interruption period, the flat panel display device performs a touch detection operation, so that the touch detection operation can be performed during the gate lines driving scan process and do not need to wait for all the gate lines having been scanned, the frequency of touch detection operation is increased and multi-touch can be achieved.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A GOA driving circuit applied for a flat panel display device, comprising:
   a front-stage circuit comprising a plurality of cascade-connected GOA driving subunits;
   a middle-stage circuit comprising two cascade-connected GOA driving subunits, wherein an input terminal of a former stage of the GOA driving subunits in the middle-stage circuit is electrically connected to an output terminal of a last stage of the plurality of GOA driving subunits in the front-stage circuit;
   a rear-stage circuit comprising a plurality of cascade-connected GOA driving subunits, wherein an input terminal of a first stage of the plurality of GOA driving subunits in the rear-stage circuit is electrically connected to an output terminal of a latter stage of the GOA driving subunits in the middle-stage circuit;
   wherein the GOA driving subunits in the front-stage circuit, the middle-stage circuit and the rear-stage circuit are configured for receiving a first clock signal and a second clock signal to sequentially generate corresponding gate driving signals respectively, an interruption period is set in the first clock signal and the second clock signal to generate an interruption between the sequentially generated gate driving signals, and the flat panel display device is configured for performing a touch detection operation in the interruption period; the interruption period is greater than a time of one pulse signal and less than a time of one frame image;
   wherein the first clock signal and the second clock signal each comprise a first period, the interruption period, a restore period and a second period;
   in the first period, the first clock signal and the second clock signal respectively output pulse signals with just opposite polarities, the GOA driving subunits in the front-stage circuit of the GOA driving circuit sequentially output a part of the sequentially generated gate driving signals to drive a part of gate lines of the flat panel display device respectively;
   in the interruption period, the first clock signal is maintained at a first logic and the second clock signal is maintained at a second logic, a polarity of the first logic and a polarity of the second logic are opposite; and in the interruption period, the middle-stage circuit and the rear-stage circuit of the GOA driving circuit stop outputting of gate driving signal;
   in the restore period, the first clock signal is maintained at the second logic, the second clock signal outputs one second logic signal and one first logic signal, and the middle-stage circuit of the GOA driving circuit restores to output succeeding two gate driving signals;
   in the second period, the first clock signal and the second clock signal respectively output pulse signals with just opposite polarities, the rear-stage circuit of the GOA driving circuit outputs the remaining of the sequentially generated gate driving signals.

2. The GOA driving circuit as claimed in claim 1, wherein each stage of the GOA driving subunits in the front-stage circuit, the middle-stage circuit and the rear-stage circuit is electrically connected to a corresponding gate line and configured for outputting a corresponding one of the sequentially generated gate driving signals to the corresponding gate line.

3. The GOA driving circuit as claimed in claim 1, wherein the first logic is a logic low level, and the second logic is a logic high level.

4. The GOA driving circuit as claimed in claim 1, wherein the interruption period is adjusted according to actual requirement.

5. The GOA driving circuit as claimed in claim 1, wherein the front-stage circuit, the middle-stage circuit and the rear-stage circuit each comprise an odd stage GOA driving subunit and an even stage GOA driving subunit.

6. The GOA driving circuit as claimed in claim 5, wherein the odd stage GOA driving subunit and the even stage GOA driving subunit of the front-stage circuit each comprise:
   a first inverter comprising an input terminal, a first clock control terminal, a second clock control terminal and an output terminal, the input terminal of the first inverter being electrically connected to an output terminal of a preceding stage GOA driving subunit;
   a second inverter, an input terminal of the second inverter being electrically connected to the output terminal of the first inverter;
   a first NOR gate and a second NOR gate, a first input terminal of the first NOR gate being electrically connected to an output terminal of the second inverter, a second input terminal of the first NOR gate being electrically connected to an output terminal of the second NOR gate, an output terminal of the first NOR gate being electrically connected to a first input terminal of the second NOR gate, and a second input terminal of the second NOR gate being electrically connected to the input terminal of the second inverter;

a NAND gate, a first input terminal of the NAND gate being electrically connected to the first clock signal or the second clock signal, and a second input terminal of the NAND gate being electrically connected to the output terminal of the second NOR gate;

a third inverter, an input terminal of the third inverter being electrically connected to an output terminal of the NAND gate;

a fourth inverter, an input terminal of the fourth inverter being electrically connected to an output terminal of the third inverter, and an output terminal of the fourth inverter being used as an output terminal of current stage GOA driving subunit to output a corresponding one of the sequentially generated gate driving signals;

wherein in the odd stage GOA driving subunit of the front-stage circuit, the first clock control terminal of the first inverter is electrically connected to the first clock signal, the second clock control terminal of the first inverter is electrically connected to the second clock signal, and the first input terminal of the NAND gate is electrically connected to the first clock signal;

wherein in the even stage GOA driving subunit of the front-stage circuit, the first clock control terminal of the first inverter is electrically connected to the second clock signal, the second clock control terminal of the first inverter is electrically connected to the first clock signal, and the first input terminal of the NAND gate is electrically connected to the second clock signal.

7. The GOA driving circuit as claimed in claim 5, wherein the odd stage GOA driving subunit in the middle-stage circuit comprises:

a first inverter comprising an input terminal, a first clock control terminal, a second clock control terminal and an output terminal, the input terminal of the first inverter being electrically connected to the output terminal of the last stage GOA driving subunit in the front-stage circuit;

a second inverter, an input terminal of the second inverter being electrically connected to an output terminal of the first inverter;

a first NOR gate and a second NOR gate, a first input terminal of the first NOR gate being electrically connected to an output terminal of the second inverter, a second input terminal of the first NOR gate being electrically connected to an output terminal of the second NOR gate, an output terminal of the first NOR gate being electrically connected to a first input terminal of the second NOR gate, and a second input terminal of the second NOR gate being electrically connected to the input terminal of the second inverter;

a tri-state NAND gate comprising a first input terminal, a second input terminal, a third input terminal and an output terminal, the first input terminal of the tri-state NAND gate being electrically connected to the output terminal of the second NOR gate;

a third inverter, an input terminal of the third inverter being electrically connected to the output terminal of the tri-state NAND gate;

a fourth inverter, an input terminal of the fourth inverter being electrically connected to an output terminal of the third inverter, and output terminal of the fourth inverter being used as an output terminal of current stage GOA driving subunit to output a corresponding one of the sequentially generated gate driving signal;

wherein in the odd stage GOA driving subunit of the middle-stage circuit, the first clock control terminal of the first inverter and the second input terminal of the tri-state NAND gate are electrically connected to the first clock signal, the second clock control terminal of the first inverter and the third input terminal of the tri-state NAND gate are electrically connected to the second clock signal;

the even stage GOA driving subunit in the middle-stage circuit comprises:

a first inverter comprising an input terminal, a first clock control terminal, a second clock terminal and an output terminal, the input terminal of the first inverter being electrically connected to an output terminal of a preceding stage GOA driving subunit;

a second inverter, an input terminal of the second inverter being electrically connected to the output terminal of the first inverter;

a first NOR gate and a second NOR gate, a first input terminal of the first NOR gate being electrically connected to an output terminal of the second inverter, a second input terminal of the first NOR gate being electrically connected to an output terminal of the second NOR gate, an output terminal of the first NOR gate being electrically connected to a first input terminal of the second NOR gate, and a second input terminal of the second NOR gate being electrically connected to the input terminal of the second inverter;

a third inverter, an input terminal of the third inverter being electrically connected to the output terminal of the second NOR gate;

a fourth inverter comprising a first input terminal, a second input terminal and an output terminal, the first input terminal of the fourth inverter being electrically connected to an output terminal of the third inverter;

a fifth inverter, an input terminal of the fifth inverter being electrically connected to the output terminal of the fourth inverter, and an output terminal of the fifth inverter being used as an output terminal of current stage GOA driving subunit to output a corresponding one of the sequentially generated gate driving signals;

wherein in the even stage GOA driving subunit of the middle-stage circuit, the first clock control terminal of the first inverter and the second input terminal of the fourth inverter are electrically connected to the second clock signal, the second clock control terminal of the first inverter is electrically connected to the first clock signal.

8. The GOA driving circuit as claimed in claim 5, wherein the odd stage GOA driving subunit and the even stage GOA driving subunit in the rear-stage circuit each comprise:

a first inverter comprising an input terminal, a first clock control terminal, a second clock control terminal and an output terminal, the input terminal of the first inverter being electrically connected to an output terminal of a last stage GOA driving subunit in the front-stage circuit;

a second inverter, an input terminal of the second inverter being electrically connected to the output terminal of the first inverter;

a first NOR gate and a second NOR gate, a first input terminal of the first NOR gate being electrically connected to an output terminal of the second inverter, a second input terminal of the first NOR gate being electrically connected to an output terminal of the second NOR gate, an output terminal of the first NOR gate being electrically connected to a first input terminal of the second NOR gate, and a second input terminal of the second NOR gate being electrically connected to the input terminal of the second inverter;

a NAND gate, a first input terminal of the NAND gate being electrically connected to the first clock signal or the second clock signal, and a second input terminal of the NAND gate being electrically connected to the output terminal of the second NOR gate;

a third inverter, an input terminal of the third inverter being electrically connected to an output terminal of the NAND gate;

a fourth inverter, an input terminal of the fourth inverter being electrically connected to an output terminal of the third inverter, and an output terminal of the fourth inverter being used as an output terminal of current stage GOA driving subunit to output a corresponding one of the sequentially generated gate driving signals;

wherein in the odd stage GOA driving subunit of the rear-stage circuit, the first clock control terminal of the first inverter is electrically connected to the first clock signal, the second clock control terminal of the first inverter is electrically connected to the second clock signal, and the first input terminal of the NAND gate is electrically connected to the first clock signal;

wherein in the even stage GOA driving subunit of the rear-stage circuit, the first clock control terminal of the first inverter is electrically connected to the second clock signal, the second clock control terminal of the first inverter is electrically connected to the first clock signal, and the first input terminal of the NAND gate is electrically connected to the second clock control signal.

9. A GOA driving circuit applied for a flat panel display device, comprising:

a front-stage circuit comprising a plurality of cascade-connected GOA driving subunits;

a middle-stage circuit comprising two cascade-connected GOA driving subunits, wherein an input terminal of a former stage of the GOA driving subunits in the middle-stage circuit is electrically connected to an output terminal of a last stage of the plurality of GOA driving subunits in the front-stage circuit;

a rear-stage circuit comprising a plurality of cascade-connected GOA driving subunits, wherein an input terminal of a first stage of the plurality of GOA driving subunits in the rear-stage circuit is electrically connected to an output terminal of a latter stage of the GOA driving subunits in the middle-stage circuit;

wherein the GOA driving subunits in the front-stage circuit, the middle-stage circuit and the rear-stage circuit are configured for receiving a first clock signal and a second clock signal to sequentially generate corresponding gate driving signals respectively, an interruption period is set in the first clock signal and the second clock signal to generate an interruption between the sequentially generated gate driving signals, and the flat panel display device is configured for performing a touch detection operation in the interruption period;

wherein the first clock signal and the second clock signal each comprise a first period, the interruption period, a restore period and a second period;

in the first period, the first clock signal and the second clock signal respectively output pulse signals with just opposite polarities, the GOA driving subunits in the front-stage circuit of the GOA driving circuit sequentially output a part of the sequentially generated gate driving signals to drive a part of gate lines of the flat panel display device respectively;

in the interruption period, the first clock signal is maintained at a first logic and the second clock signal is maintained at a second logic, a polarity of the first logic and a polarity of the second logic are opposite; and in the interruption period, the middle-stage circuit and the rear-stage circuit of the GOA driving circuit stop outputting of gate driving signal;

in the restore period, the first clock signal is maintained at the second logic, the second clock signal outputs one second logic signal and one first logic signal, and the middle-stage circuit of the GOA driving circuit restores to output succeeding two gate driving signals;

in the second period, the first clock signal and the second clock signal respectively output pulse signals with just opposite polarities, the rear-stage circuit of the GOA driving circuit outputs the remaining of the sequentially generated gate driving signals.

10. The GOA driving circuit as claimed in claim 9, wherein each stage of the GOA driving subunits in the front-stage circuit, the middle-stage circuit and the rear-stage circuit is electrically connected to a corresponding gate line and configured for outputting a corresponding one of the sequentially generated gate driving signals to the corresponding gate line.

11. The GOA driving circuit as claimed in claim 9, wherein the first logic is a logic low level, and the second logic is a logic high level.

12. The GOA driving circuit as claimed in claim 9, wherein the interruption period is adjusted according to actual requirement.

13. The GOA driving circuit as claimed in claim 9, wherein the front-stage circuit, the middle-stage circuit and the rear-stage circuit each comprise an odd stage GOA driving subunit and an even stage GOA driving subunit.

14. The GOA driving circuit as claimed in claim 13, wherein the odd stage GOA driving subunit and the even stage GOA driving subunit of the front-stage circuit each comprise:

a first inverter comprising an input terminal, a first clock control terminal, a second clock control terminal and an output terminal, the input terminal of the first inverter being electrically connected to an output terminal of a preceding stage GOA driving subunit;

a second inverter, an input terminal of the second inverter being electrically connected to the output terminal of the first inverter;

a first NOR gate and a second NOR gate, a first input terminal of the first NOR gate being electrically connected to an output terminal of the second inverter, a second input terminal of the first NOR gate being electrically connected to an output terminal of the second NOR gate, an output terminal of the first NOR gate being electrically connected to a first input terminal of the second NOR gate, and a second input terminal of the second NOR gate being electrically connected to the input terminal of the second inverter;

a NAND gate, a first input terminal of the NAND gate being electrically connected to the first clock signal or the second clock signal, and a second input terminal of the NAND gate being electrically connected to the output terminal of the second NOR gate;

a third inverter, an input terminal of the third inverter being electrically connected to an output terminal of the NAND gate;

a fourth inverter, an input terminal of the fourth inverter being electrically connected to an output terminal of the third inverter, and an output terminal of the fourth inverter being used as an output terminal of current stage GOA driving subunit to output a corresponding one of the sequentially generated gate driving signals;

wherein in the odd stage GOA driving subunit of the front-stage circuit, the first clock control terminal of the first inverter is electrically connected to the first clock signal, the second clock control terminal of the first inverter is electrically connected to the second clock signal, and the first input terminal of the NAND gate is electrically connected to the first clock signal;

wherein in the even stage GOA driving subunit of the front-stage circuit, the first clock control terminal of the first inverter is electrically connected to the second clock signal, the second clock control terminal of the first inverter is electrically connected to the first clock signal, and the first input terminal of the NAND gate is electrically connected to the second clock signal.

15. The GOA driving circuit as claimed in claim 13, wherein the odd stage GOA driving subunit in the middle-stage circuit comprises:

a first inverter comprising an input terminal, a first clock control terminal, a second clock control terminal and an output terminal, the input terminal of the first inverter being electrically connected to the output terminal of the last stage GOA driving subunit in the front-stage circuit;

a second inverter, an input terminal of the second inverter being electrically connected to an output terminal of the first inverter;

a first NOR gate and a second NOR gate, a first input terminal of the first NOR gate being electrically connected to an output terminal of the second inverter, a second input terminal of the first NOR gate being electrically connected to an output terminal of the second NOR gate, an output terminal of the first NOR gate being electrically connected to a first input terminal of the second NOR gate, and a second input terminal of the second NOR gate being electrically connected to the input terminal of the second inverter;

a tri-state NAND gate comprising a first input terminal, a second input terminal, a third input terminal and an output terminal, the first input terminal of the tri-state NAND gate being electrically connected to the output terminal of the second NOR gate;

a third inverter, an input terminal of the third inverter being electrically connected to the output terminal of the tri-state NAND gate;

a fourth inverter, an input terminal of the fourth inverter being electrically connected to an output terminal of the third inverter, and output terminal of the fourth inverter being used as an output terminal of current stage GOA driving subunit to output a corresponding one of the sequentially generated gate driving signal;

wherein in the odd stage GOA driving subunit of the middle-stage circuit, the first clock control terminal of the first inverter and the second input terminal of the tri-state NAND gate are electrically connected to the first clock signal, the second clock control terminal of the first inverter and the third input terminal of the tri-state NAND gate are electrically connected to the second clock signal;

the even stage GOA driving subunit in the middle-stage circuit comprises:

a first inverter comprising an input terminal, a first clock control terminal, a second clock terminal and an output terminal, the input terminal of the first inverter being electrically connected to an output terminal of a preceding stage GOA driving subunit;

a second inverter, an input terminal of the second inverter being electrically connected to the output terminal of the first inverter;

a first NOR gate and a second NOR gate, a first input terminal of the first NOR gate being electrically connected to an output terminal of the second inverter, a second input terminal of the first NOR gate being electrically connected to an output terminal of the second NOR gate, an output terminal of the first NOR gate being electrically connected to a first input terminal of the second NOR gate, and a second input terminal of the second NOR gate being electrically connected to the input terminal of the second inverter;

a third inverter, an input terminal of the third inverter being electrically connected to the output terminal of the second NOR gate;

a fourth inverter comprising a first input terminal, a second input terminal and an output terminal, the first input terminal of the fourth inverter being electrically connected to an output terminal of the third inverter;

a fifth inverter, an input terminal of the fifth inverter being electrically connected to the output terminal of the fourth inverter, and an output terminal of the fifth inverter being used as an output terminal of current stage GOA driving subunit to output a corresponding one of the sequentially generated gate driving signals;

wherein in the even stage GOA driving subunit of the middle-stage circuit, the first clock control terminal of the first inverter and the second input terminal of the fourth inverter are electrically connected to the second clock signal, the second clock control terminal of the first inverter is electrically connected to the first clock signal.

16. The GOA driving circuit as claimed in claim 13, wherein the odd stage GOA driving subunit and the even stage GOA driving subunit in the rear-stage circuit each comprise:

a first inverter comprising an input terminal, a first clock control terminal, a second clock control terminal and an output terminal, the input terminal of the first inverter being electrically connected to an output terminal of a last stage GOA driving subunit in the front-stage circuit;

a second inverter, an input terminal of the second inverter being electrically connected to the output terminal of the first inverter;

a first NOR gate and a second NOR gate, a first input terminal of the first NOR gate being electrically connected to an output terminal of the second inverter, a second input terminal of the first NOR gate being electrically connected to an output terminal of the second NOR gate, an output terminal of the first NOR gate being electrically connected to a first input terminal of the second NOR gate, and a second input terminal of the second NOR gate being electrically connected to the input terminal of the second inverter;

a NAND gate, a first input terminal of the NAND gate being electrically connected to the first clock signal or the second clock signal, and a second input terminal of the NAND gate being electrically connected to the output terminal of the second NOR gate;

a third inverter, an input terminal of the third inverter being electrically connected to an output terminal of the NAND gate;

a fourth inverter, an input terminal of the fourth inverter being electrically connected to an output terminal of the third inverter, and an output terminal of the fourth inverter being used as an output terminal of current stage GOA driving subunit to output a corresponding one of the sequentially generated gate driving signals;

wherein in the odd stage GOA driving subunit of the rear-stage circuit, the first clock control terminal of the first inverter is electrically connected to the first clock signal, the second clock control terminal of the first inverter is electrically connected to the second clock signal, and the first input terminal of the NAND gate is electrically connected to the first clock signal;

wherein in the even stage GOA driving subunit of the rear-stage circuit, the first clock control terminal of the first inverter is electrically connected to the second clock signal, the second clock control terminal of the first inverter is electrically connected to the first clock signal, and the first input terminal of the NAND gate is electrically connected to the second clock control signal.

17. A flat panel display device comprising the GOA driving circuit as claimed in claim 9.

18. The flat panel display device as claimed in claim 17, wherein the interruption period is greater than a time of one pulse signal and less than a time of one frame image.

\* \* \* \* \*